US005958344A

United States Patent [19]
Levine et al.

[11] Patent Number: 5,958,344
[45] Date of Patent: *Sep. 28, 1999

[54] SYSTEM FOR LIQUID DISTRIBUTION

[75] Inventors: Aaron W. Levine, Lawrenceville; Satyam Choudary Cherukuri, Cranbury; James Regis Matey, Hamilton Township, Mercers County, all of N.J.

[73] Assignee: Sarnoff Corporation, Princeton, N.J.

[ * ] Notice: This patent is subject to a terminal disclaimer.

[21] Appl. No.: 08/745,767

[22] Filed: Nov. 8, 1996

Related U.S. Application Data

[60] Provisional application No. 60/006,409, Nov. 9, 1995.

[51] Int. Cl.$^6$ .............................. B01L 11/00; F16K 31/00

[52] U.S. Cl. .............................. 422/103; 422/100; 251/11

[58] Field of Search .............................. 422/58, 100, 103; 251/11, 61.1

[56] References Cited

U.S. PATENT DOCUMENTS

| | | | |
|---|---|---|---|
| 2,797,150 | 6/1957 | Rigby | 422/103 |
| 3,620,678 | 11/1971 | Guigan | 422/66 |
| 3,715,190 | 2/1973 | Won Kil Park et al. | 422/100 |
| 3,760,832 | 9/1973 | McGowen et al. | 137/155 |
| 4,276,260 | 6/1981 | Drbal et al. | 422/100 |
| 5,213,967 | 5/1993 | Erdman et al. | 422/63 |
| 5,462,748 | 10/1995 | Lloyd et al. | 422/64 |
| 5,598,721 | 2/1997 | Rockenfeller et al. | 62/480 |

*Primary Examiner*—Lyle A. Alexander
*Attorney, Agent, or Firm*—William J. Burke

[57] ABSTRACT

A liquid distribution system comprising a reaction cell, two or more feeder channels, a separate conduit for each feeder channel connecting that feeder channel to the reaction cell, and a expansion valve for each conduit, wherein the expansion valve has an expanded state that fills a cross-section of the conduit and prevents fluid flow through the conduit and an contracted state that allows fluid flow through the conduit is disclosed.

12 Claims, 3 Drawing Sheets

SYSTEM FOR LIQUID DISTRIBUTION

This application claims benefit of provisional application 60/006,409, filed Nov. 9, 1995.

This application relates to a method and system for manipulating fluids, which is useful in a number of contexts, including in accomplishing chemical reactions, including various chemical synthesis, diagnostic and drug screening reactions.

Recently, a number of public reports have focused on the problems associated with conducting chemical reactions on a micro-scale. This literature has discussed the possibility of managing such reactions on wafer-sized solid supports that have been etched to create microchannels. Reactor systems of this scale could allow multiple diagnostic or drug screening assays to be conducted in a transportable device that uses small amounts of reagents, thus reducing supply and disposal costs.

In additionombinatorial chemistry seeks to create the large family of compounds by permutation of a relatively limited set of building block chemicals. Preferably, the combinatorial method will create identifiable pools containing one or more synthetic compounds. These pools need not be identifiable by the chemical structure of the component compounds, but should be identifiable by the chemical protocol that created the compounds. These pools are then screened in an assay that is believed to correlate with a pharmacological activity. Those pools that produce promising results are examined further to identify the component compounds and to identify which of the component compounds are responsible for the results.

Miniaturization is usefully employed in combinatorial chemistry since: (i) workers generally seek compounds that are pharmacologically active in small concentrations; (ii) in creating a vast "evolutionary" assortment of candidate molecules it is preferable to have the numerous reactions well documented and preferably under the direction of a limited number of workers to establish reproducibility of technique; (iii) it is expensive to create a vast, traditionally-scaled synthetic chemistry complex for creating a sufficiently varied family of candidate compounds; and (iv) substantial concerns are raised by the prospect of conducting assays of the products of combinatorial chemistry at more standard reaction scales. Miniaturization allows for the economic use of robotic control, thereby furthering reproducibility.

The wafer-sized devices described above can be ideal for combinatorial chemistry, allowing for numerous synthetic chemistry reactions to be conducted substantially under computer control using only small quantities of reagents. However, the academic literature advocating such microscale devices has not adequately addressed fundamental issues in conducting combinatorial chemistry at this scale: for instance, how does one manage to shuttle reagents through a complex microscale device and accomplish this without significant cross-contamination while allowing a complex assortment of different syntheses to occur in a large number of microscale reaction vessels (e.g., 100 to 10,000) in the device. The present invention provides a microscale device that solves these issues.

SUMMARY OF THE INVENTION

The invention provides, among other things, a liquid distribution system comprising a reaction cell; two or more feeder channels, a separate conduit for each feeder channel connecting that feeder channel to the reaction cell, and an expansion valve for each conduit, wherein the expansion valve has an expanded state that fills a cross-section of the conduit and prevents fluid flow through the conduit and an contracted state that allows fluid flow through the conduit.

DEFINITIONS

Figure 1:
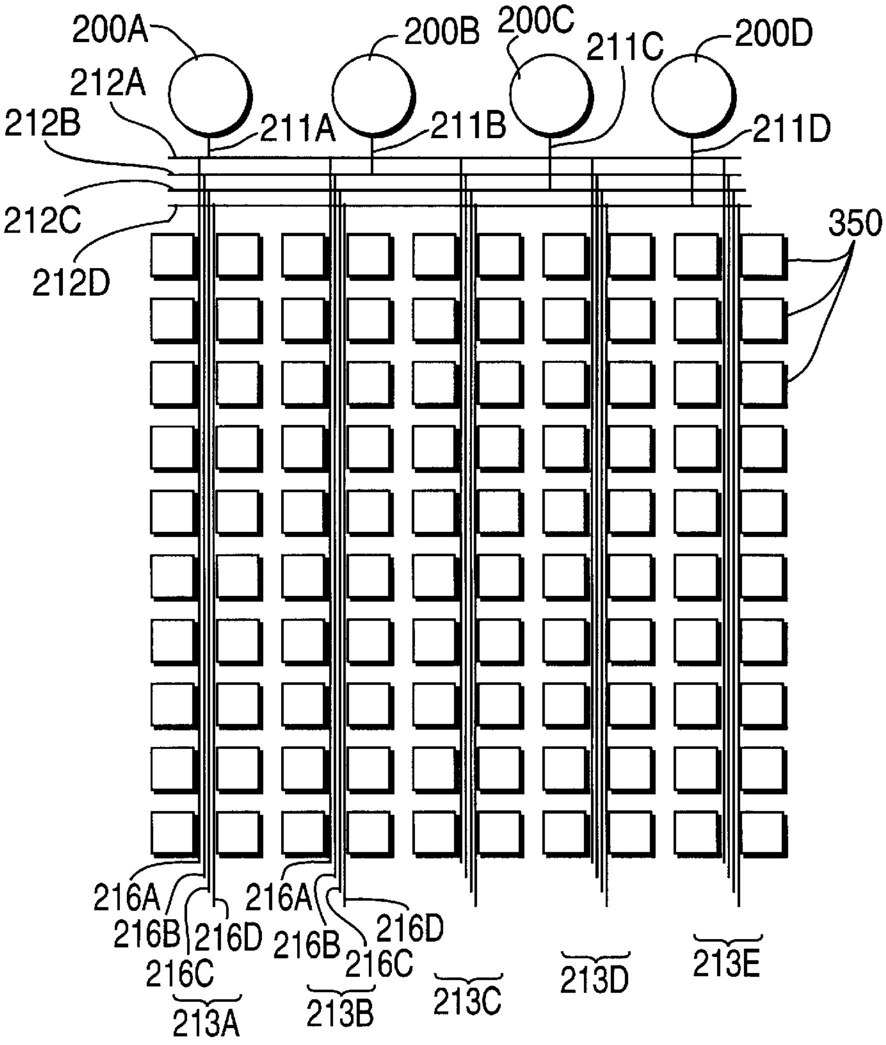
FIG. 1 shows a system of channels for addressing any of one hundred reaction cells with any of four fluids.

The following terms shall have the meaning set forth below:

addressable: a reaction cell or channel is "addressable" by a reservoir or another channel if liquid from the reservoir or other channel can be directed to the reaction cell or channel.

adjacent: "adjacent" as used in these situations: (i) a first structure in one of the plates is adjacent to a second structure in the same or another plate if the vertical projection of the first structure onto the plate of the second structure superimposes the first structure on the second or places it within about 250 μm of the second; and (ii) groupings of two or more channels are adjacent to one another if each channel is in substantially the same horizontal plane, and all but the outside two channels in the grouping are adjacent (in the sense defined in (i) above) to two neighbor channels in the grouping. Preferably, under item (i), a first structure is adjacent to a second structure if the vertical projection of the first structure onto the plate of the second structure superimposes the first structure on the second or places it within about 150 μm of the second.

capillary dimensions: dimensions that favor capillary flow of a liquid. Typically, channels of capillary dimensions are no wider than about 1.5 mm. Preferably channels are no wider than about 500 μm, yet more preferably no wider than about 250 μm, still more preferably no wider than about 150 μm.

capillary barrier: a barrier to fluid flow in a channel comprising an opening of the channel into a larger space designed to favor the formation, by liquid in the channel, of an energy minimizing liquid surface such as a meniscus at the opening. Preferably, capillary barriers include a dam that raises the vertical height of the channel immediately before the opening into the larger space.

connected: the channels, reservoirs and reaction cells of the invention are "connected" if there is a route allowing fluid between them, which route does not involve using a reaction cell as part of the link.

directly connected: reservoirs and horizontal channels are "directly connected" if they are connected and either (1) no other channel is interposed between them or (2) only a single vertical channel is interposed between them.

expansion valve: an expandable chamber, associated with a fluid channel, which chamber (a) is filled with a gas or a liquid with a boiling point within about 10° C. of the intended operating temperature of the liquid distribution system and (b) has an associated heater element for heating the expandable chamber to boil the liquid or expand the gas to cause sufficient expansion of the expandable chamber to fill a cross-section of the fluid channel.

hole diameter: because techniques for fabricating small holes often create holes that are wider at one end than the other (for instance, about 50 micrometers (μm) wider), the hole diameter values recited herein refer to the narrowest diameter.

horizontal, vertical, EW, NS: indications of the orientation of a part of the distribution system refer to the orientation when the device is in use. The notations “EW axis” and “NS axis” are in reference to FIGS. 1, 2, 3 and 7, where an EW axis goes from right to left and is perpendicular to the long axis of the page and a NS axis is from top to bottom parallel to the long axis of the page.

independent: channels, reservoirs or reaction cells that are not connected.

offset: two sets of channels are “offset” when none of the channels in the first such set is adjacent to any of the channels in the second set.

perpendicular: channels in the distribution plate are perpendicular even if primarily located on separate horizontal planes if their vertical projections onto the same horizontal plane are perpendicular.

reservoir: unless a different meaning is apparent from the context, the terms “reservoir” and “fluid reservoir” include the horizontal extension channels (sometimes simply termed “extensions”) directly connected to the reservoir or fluid reservoir.

DETAILED DESCRIPTION

The invention relates to a system and method, which incorporates a layered array, for distributing reagent liquids while inhibiting the contamination or cross-contamination of these liquids. One version of the invention is an expansion valve liquid distribution system made up of a reaction cell, two or more feeder channels, a separate conduit for each feeder channel connecting that feeder channel to the reaction cell, and a expansion valve for each conduit, wherein the expansion valve has an expanded state that fills a cross-section of the conduit and prevents fluid flow through the conduit and an contracted state that allows fluid flow through the conduit. In a preferred embodiment, conduits have two or more, preferably three or more, expansion valves which can be operated in concert to pump liquid from the connected feeder channel into the reaction cell.

A. A Basic Liquid Distribution System

Figure 2:
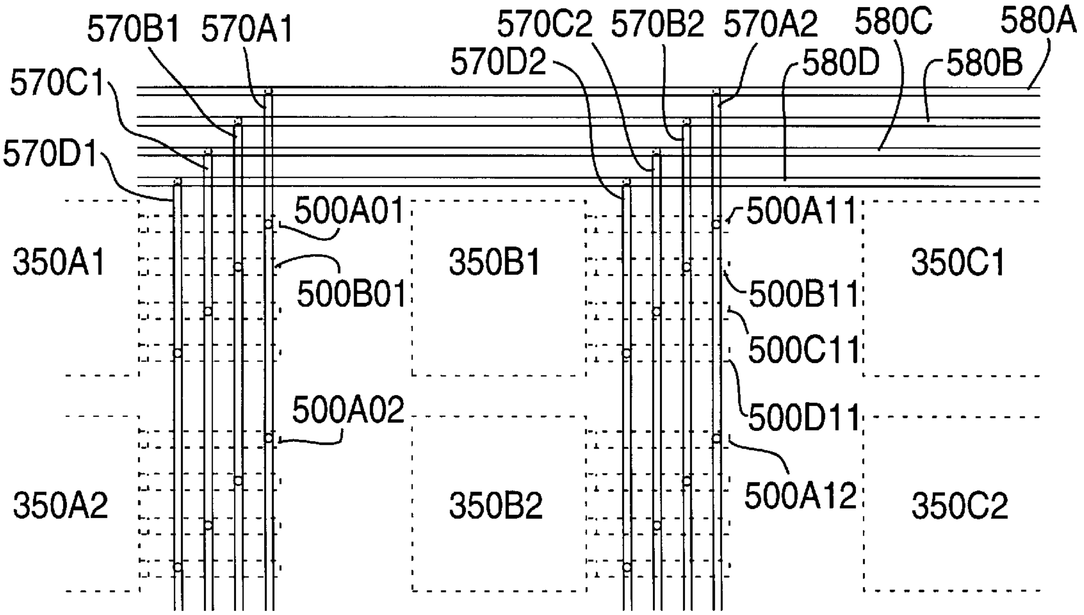
FIG. 2 shows a top view of an expansion valve liquid distribution system.

The invention relates to methods of addressing a large number of reaction cells 350 with a plurality of fluid reservoirs 200 (see FIGS. 1 and 2). In FIG. 1, reservoirs 200A–200D are connected to reservoir extension channels 212A–212D via first connector channels 211A–211D, respectively. The ceilings of channels 211A–211D are located in a lower horizontal plane than the floors of channels 212A–212D, thereby assuring, for instance, that fluid from reservoir 200B does not leak into the channel 212A connected to reservoir 200A. Each channel 211A–211D connects with its respective channels 212A–212D via vertical channels (not illustrated). Connected to channels 212A–212D are first, second, third, fourth and fifth sets 213A–213E of first, second, third and fourth feeder channels 216A–216D. The ceilings of these feeder channels 216A–216D are located in a horizontal plane beneath the floors of the channels 212A–212D. Via these channels 216A–216D, fluid from each of the four first reservoirs 200A–200D can be brought to a location in the vicinity of any of the one hundred reaction cells 350 into which the fluid can be moved under the control of pumps or valves as described hereinbelow. Note that cells 350 are located in a lower horizontal plane than feeder channels 216A–216D. Other geometries by which a large number of reaction cells can be addressed by separate fluid reservoirs are described below.

Features of other distribution systems described in this application can be applied to this embodiment, irrespective of under which subheading they are described. It will be understood by those of ordinary skill that while the embodiments of the invention are described with reference to channels that join at orthogonal angles, other angles are possible. In preferred embodiments of the invention the operational flow rate (i.e., the flow rate when the appropriate flow-inducing mechanisms are activated) from a given reservoir (e.g. first fluid reservoir 200) to a given reaction cell 350 is from about 0.01 μl/min to about 10 μl/min, more preferably from about 0.1 μl/min to about 0.3 μl/min.

A. Expansion Valve Liquid Distribution System

The expansion valve liquid distribution system has a reaction cell, two or more feeder channels, a separate conduit connecting each feeder channel to the reaction cell, and a expansion valve for each conduit, wherein the expansion valve has an expanded state that fills a cross-section of the conduit and prevents fluid flow through the conduit and an contracted state that allows fluid flow through the conduit. The expansion valve distribution system is preferably constructed of plastic, rather than glass or a silicon-based material. Preferred plastics include polyethylene, polypropylene, liquid crystal engineering plastics, polyvinylidine fluoride and polytetrafluoroethylene. Plastics with low moisture vapor transmission rates (e.g., polyethylene, polyvinylidine fluoride and polytetrafluoroethylene) are particularly preferred. Laminates such as a laminate of polyethylene and a polyester such as poly(ethyleneterephthalate) are also preferred for their vapor barrier properties. The channels or conduits of this embodiment are preferably as described below in Section F, which describes fabrication methods. However, this embodiment can more readily be used with larger scale features, such as larger channels and reaction cells.

FIG. 2 shows a schematic having fifth through eighth primary supply channels 580A through 580D, respectively. Fifth primary supply channel 580A connects to first alpha feeder channel 570A1, second alpha feeder channel 570A2, and so on. Sixth through eighth primary supply channels, 580B through 580D, respectively, are also connected to feeder channels. Focusing on second alpha feeder channel 570A2, second beta feeder channel 570B2, second gamma channel 570C2 and second delta feeder channel 570D2, these are each connected to a number of alpha distribution channels 500A, beta distribution channels 500B, gamma distribution channels 500C and delta distribution channels 500D, respectively. For instance, second alpha feeder channel 570A2 is connected to eleventh alpha distribution channel 500A11, twelfth alpha distribution channel 500A12, and so on. Sets of four distribution channels 500, e.g. eleventh alpha distribution channel 500A11, eleventh beta distribution channel 500B11, eleventh gamma distribution channel 500C11, and eleventh delta distribution channel 500D11, are connected to a given reaction cell 350.

As illustrated below, each distribution channel 500 has an expansion valve which can be activated to block flow from the feeder channels 570 into the cell 350 connected via the channel 500. In one preferred embodiment, fluid in the primary supply channels 580 and feeder channels 570 is maintained a constant pressure for instance using upstream pumps or gas pressurization and possibly downstream pressure release valves.

Figure 3A:
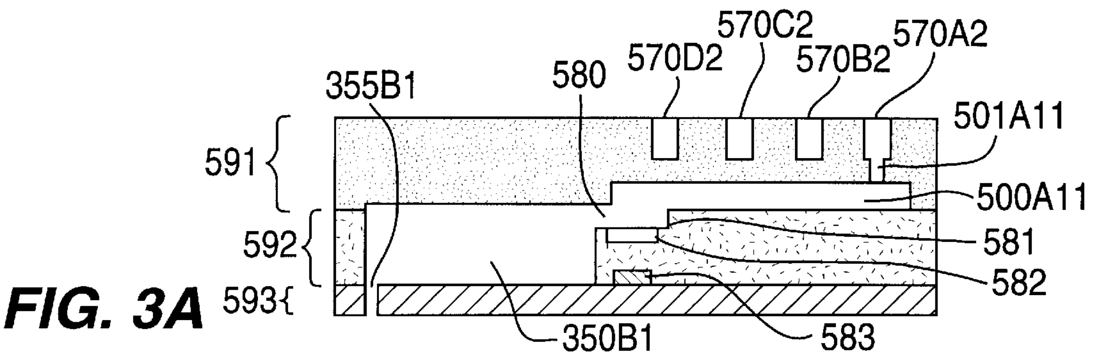
FIGS. 3A, 3B and 3C show cross-sectional views of various embodiments of the expansion valve liquid distribution system

FIG. 3A shows a cross-section through eleventh alpha distribution channel 500A11. Three of the plates that form the distribution system, first plate 591, second plate 592 and third plate 593, are illustrated. Second alpha feeder channel 570A2, second beta feeder channel 570B2, second gamma feeder channel 570A2 and second delta feeder channel 570 D2 can be formed in a molding process used to form first plate 591. Eleventh alpha distribution channel 500A11 is primarily formed with parts of first plate 591 and second plate 592 and can be formed during the molding process used to form these plates. The portion 501A11 of eleventh alpha distribution channel 500A11 connecting to second alpha feeder channel 570A2 can be formed using a drilling process, such as a laser drilling process. The portion 502A11 (see FIG. 3B) of eleventh alpha distribution channel 500A11 that connects to reaction cell 350B1 is typically formed during the molding of second plate 592. Expansion valve 580 includes a low modulus, elastomeric film 581 such as a hydrocarbon elastomer, acrylonitrile-based elastomer or polyurethane films, which films include natural latex films, ethylene-propylene rubber and acrylonitrile-butadiene-styrene copolymer films. The elastomeric film can, for example, be bonded to the substrate using an adhesive such as a thermal setting acrylic, polyurea or polysulfide adhesive or it can be bonded by for example thermal compression bonding or ultrasonic welding. Elastomeric film 581 covers a fluid chamber 582 that is filled with a gas, such as air or argon, or with a low-boiling liquid, such as freon or another refrigerant. Situated sufficiently near fluid chamber 582 is an heating element 583, which is preferably controlled by controller 10. The heating element 583 functions to heat the gas or liquid in fluid chamber 582 to cause the expansion of the valve 580. Reaction cell 350B1 has a drain 355B1.

Heating elements 583 can be any number of heating devices known to the art including electrical resistance heaters and infrared light sources, including infrared diode lasers, such as edge-emitting diode laser arrays available from David Sarnoff Research Center, Princeton, N.J. or the 1300 nm or 1590 nm lasers available from LaserMax Inc., Rochester, N.Y. If the element 583 is an infrared light source, the material that intervenes between the element 583 and the chamber 583 preferably transmits at least about 50%, more preferably at least about 80%, of the infrared light from the element 583.

Figure 3B:
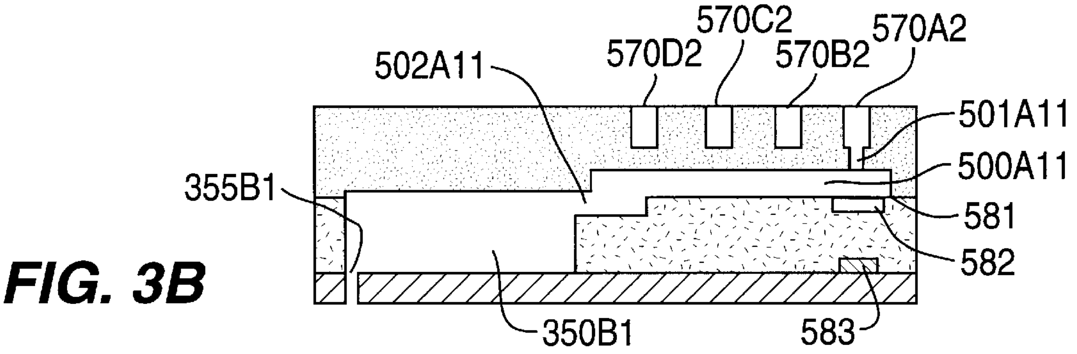

FIG. 3B shows a comparable version of a cut-away view of distribution channel 500A11 where the valve 580 is positioned differently, such that in the expanded states it blocks both distribution channel 500A11 and portion 501A11..

Figure 3C:
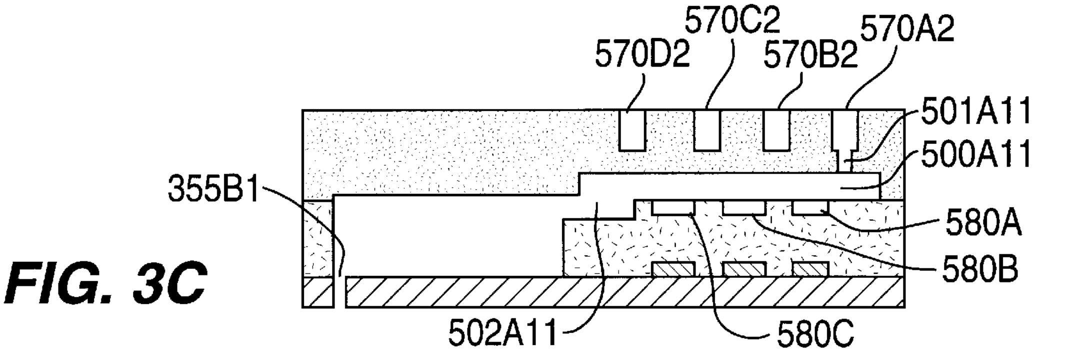

FIG. 3C shows a cut-away of a preferred embodiment where distribution channel 500A11 has a first expansion valve 580A, a second expansion valve 580B and a third expansion valve 580C. These three valves can be operated sequentially to create a pumping force that moves liquid into the reaction cell 350B1. For instance, at time one, distribution channel 500A11 is filled with a liquid and valve 580A is expanded. At time two, first expansion valve 580A remains expanded and second expansion valve 580C begins to expand, pushing liquid into the reaction cell 350B1. At time three, second expansion valve 580B remains expanded and first expansion valve 580A begins to contract drawing liquid from second alpha feeder channel 570A2 to fill the volume formerly occupied by the expanded valve. Also at time three, third expansion valve 580C begins to expand, forcing liquid to flow into reaction cell 350B1. At time four, third expansion valve 580C remains expanded and second expansion valve 580B begins to contract at the about the same time first expansion valve 580A begins to expand. At time five, first expansion valve 580A is expanded, while the other two expansion valves, 580B and 580C, are contracted, setting the stage for a new pumping cycle.

B. Controller

The controller 10 (not shown) will typically be an electronic processor. However, it can also be a simpler device comprised of timers, switches, solenoids and the like. The important feature of controller 10 is that it directs the activity of the first pumps 360 and, optionally, the activity of external pumps 171. A circuit of thin film transistors (not shown) can be formed on the liquid distribution system to provide power to the wells via leads and electrodes, and to connect them with the driving means such as the controller 10, so as to move liquids through the array. Pins can also be formed substrate which are addressable by logic circuits that are connected to the controller 10 for example.

C. Internal Pumps (Not Based on Expansion Valves)

In some contexts, it is desirable to have other internal pumps in the liquid distribution system, for instance to direct liquid into the feeder channels 570.

Any pumping device of suitable dimensions can be used as the internal first pumps 360 in the liquid distribution system of the invention. Such pumps can include microelectromechanical systems (MEMS) such as reported by Shoji et al., in *Electronics and Communications in Japan*, Part 2, 70: 52–59, 1989 or Esashi et al., in *Sensors and Actuators,* 20: 163–169, 1989 or piezo-electric pumps such as described in Moroney et al., in *Proc. MEMS,* 91: 277–282, 1991. Preferably, however, the pumps 360 have no moving parts. Such pumps 360 can comprise electrode-based pumps. At least two types of such electrode-based pumping have been described, typically under the names "electrohydrodynamic pumping" (EHD) and "electroosmosis" (EO). EHD pumping has been described by Bart et al., in *Sensors and Actuators*, A21–A23: 193–197, 1990 and Richter et al., in *Sensors and Actuators*, A29:159–168, 1991. EO pumps have been described by Dasgupta et al. in *Anal. Chem.,* 66: 1792–1798, 1994.

EO pumping is believed to take advantage of the principle that the surfaces of many solids, including quartz, glass and the like, become charged, negatively or positively, in the presence of ionic materials, such as salts, acids or bases. The charged surfaces will attract oppositely charged counter ions in solutions of suitable conductivity. The application of a voltage to such a solution results in a migration of the counter ions to the oppositely charged electrode, and moves the bulk of the fluid as well. The volume flow rate is proportional to the current, and the volume flow generated in the fluid is also proportional to the applied voltage. Typically, in channels of capillary dimensions, the electrodes effecting flow can be spaced further apart than in EHD pumping, since the electrodes are only involved in applying force, and not, as in EHD, in creating charges on which the force will act. EO pumping is generally perceived as a method appropriate for pumping conductive solutions.

EHD pumps have typically been viewed as suitable for moving fluids of extremely low conductivity, e.g., $10^{-14}$ to $10^{-9}$ S/cm. It has now been demonstrated herein that a broad range of solvents and solutions can be pumped using appropriate solutes than facilitate pumping, using appropriate electrode spacings and geometries, or using appropriate pulsed or d.c. voltages to power the electrodes, as described further below.

The electrodes of pumps 360 used in the liquid distribution system preferably have a diameter from about 25 μm to about 100 μm, more preferably from about 50 μm to about 75 μm. Preferably, the electrodes protrude from the top of a channel to a depth of from about 5% to about 95% of the depth of the channel, more preferably from about 25% to about 50% of the depth of the channel. Usually, this means the electrodes, defined as the elements that interact with fluid, are from about 5 μm to about 95 μm in length, preferably from about 25 μm about to 50 μm. Preferably, a pump includes an alpha electrode 364 (such as first electrode 360A) and a beta electrode 365 (such as third electrode 360B) that are preferably spaced from about 100 μm to about 2,500 μm apart, more preferably, from about 250 μm to about 1000 μm apart, yet more preferably, from about 150 μm to about 250 μm apart. In a particularly preferred embodiment, a gamma electrode 366 (not shown) is spaced from about 200 μm to about 5,000 μm, more preferably from about 500 μm to about 1,500 μm, yet more preferably about 1,000 μm from the farther of the alpha electrode 364 and the beta electrode 365. In an alternative preferred embodiment, the pump has two additional electrodes comprising a gamma electrode 366 (not shown) and a delta electrode 367 (not shown) that are spaced from about 200 μm to about 5,000 μm, more preferably from about 500 μm to about 1,500 μm, yet more preferably about 1,000 μm apart. In contexts where relatively low conductivity fluids are pumped, voltages are applied across the alpha electrode 364 and the beta electrode 365, while in contexts where relatively more highly conductive fluids are pumped the voltage is induced between gamma electrode 366 and one of alpha electrode 364, beta electrode 365 or delta electrode 367. The latter circumstance typically applies for solvents traditionally pumped with EO pumping, although this invention is not limited to any theory that has developed around the concepts of EHD or EO pumping. No firm rules dictate which electrode combination is appropriate for a given solvent or solution; instead an appropriate combination can be determined empirically in light of the disclosures herein.

The voltages used across alpha and beta electrodes 364 and 365 when the pump is operated in d.c. mode are typically from about 50 V to about 2,000 V, preferably from about 100 V to about 750 V, more preferably from about 200 V to about 300 V. The voltages used across gamma electrode 366 and alpha, beta or delta electrodes 364, 365 or 367 when the pump is operated in d.c. mode are typically from about 50 V to about 2,000 V, preferably from about 100 V to about 750 V, more preferably from about 200 V to about 300 V. The voltages used across alpha and beta electrodes 364 and 365 when the pump is operated in pulsed mode are typically from about 50 V to about 1,000 V, preferably from about 100 V and about 400 V, more preferably from about 200 V to about 300 V. The voltages used across gamma electrode 366 and the alpha, beta or gamma electrode 364, 365 or 367 when the pump is operated in pulsed mode are typically from about 50 V to about 1,000 V, preferably from about 100 V and about 400 V, more preferably from about 200 V to about 300 V. Preferably, the ratio of pumping to current will be such that no more than about one electron flows into the solution adjacent to a first pump 360 or second pump 361 for every 1,000 molecules that move past the pump 360 or 361, more preferably for every 10,000 molecules that move past the pump 360 or 361, yet more preferably for every 100,000 molecules that move past the pump 360 or 361.

Figure 4:
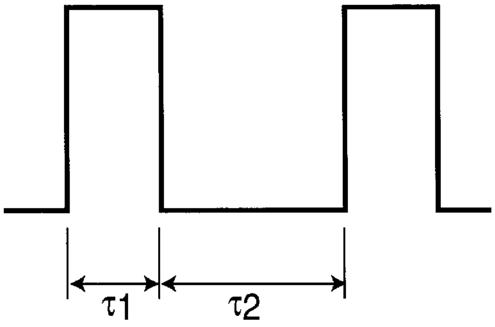
FIG. 4 shows a voltage pulse pattern used to power an electrode-based pump useful in the liquid distribution system of the invention.

It is believed that an electrode-based internal pumping system can best be integrated into the liquid distribution system of the invention with flow-rate control at multiple pump sites and with relatively less complex electronics if the pumps are operated by applying pulsed voltages across the electrodes. FIG. 4 shows an example of a pulse protocol where the pulse-width of the voltage is $\tau_1$ and the pulse interval is $\tau_2$. Typically, $\tau_1$ is between about 1 μs and about 1 ms, preferably between about 0.1 ms and about 1 ms. Typically, $\tau_2$ is between about 0.1 μs and about 10 ms, preferably between about 1 ms and about 10 ms. A pulsed voltage protocol is believed to confer other advantages including ease of integration into high density electronics (allowing for hundreds of thousands of pumps to be embedded on a wafer-sized device), reductions in the amount of electrolysis that occurs at the electrodes, reductions in thermal convection near the electrodes, and the ability to use simpler drivers. The pulse protocol can also use pulse wave geometries that are more complex than the block pattern illustrated in FIG. 4.

Another procedure that can be applied is to use a number of electrodes, typically evenly spaced, and to use a travelling wave protocol that induces a voltage at each pair of adjacent electrodes in a timed manner that first begins to apply voltage to the first and second electrodes, then to the second and third electrodes, and so on. Such methods are described in Fuhr et al., *J. Microelectrical Systems,* 1: 141–145, 1992. It is believed that travelling wave protocols can induce temperature gradients and corresponding conductivity gradients that facilitate electric field-induced fluid flow. Such temperature gradients can also be induced by positioning electrical heaters in association with the electrode-based first pumps 360 and second pumps 361.

Further operational details for electrode-based pumps can be found in Zanzucchi et al., "Liquid Distribution System," PCT No. US95/14589 or U.S. application Ser. No. 08/556, 036, filed Nov. 9, 1995, (collectively "Zanzucchi I") which is incorporated herein by reference. The disclosure of Zanzucchi I and all the priority filings named in Zanzucchi I are incorporated herein by reference in their entirety.

D. Reaction Cells and Reaction Cell Plate

The liquid distribution system of the invention is typically fabricated from multiple plates of material. This fabrication method allows for channels to be formed in the upper or lower surface of a plate such that the upper surface channels can be independent of the lower surface channels. Where desired, interconnections can be formed using vertical channels.

Reaction cells 350 are typically depressions formed in the upper layers of a reaction cell plate 320. The drain 355 to a cell 350 can be open at the bottom of the cell 350, in which case drainage is controlled kinetically and by negative pressure from the connected channels. Alternatively, the drain 355 may be adjacent to the cell 350. In this case, flushing volumes, which are substantial volumes relative to the volume of the reaction cell but minuscule in absolute amount, are passed through the cell 350 to remove all of a given reactant previously directed into the cell 350. In another alternative, the drains to cell 350 are operating using a micropump such as one of the micropumps described above.

Another way by which the cell 350 can be controllably drained is to use a bottom drain 355 having an outlet channel that has a constrictor, such as one of the expansion valves described above.

Drains are optional, since in some uses the amount of liquid moved into a cell 350 is less than the reaction cell's volume. If drains are absent, however, vents are required. Vents for the cells 350 are appropriate in other contexts.

The cell plate 320 can be reversibly bonded to the next higher plate by, for instance, assuring that the two surfaces are smoothly machined and pressing the two plates together. Or, for example, a deformable gasket, such as a teflon, polyethylene or elastomeric polymer film (such as a natural rubber, ABS rubber, polyurethane elastomer films) gasket, is interposed between the plates. One way to maintain a force adhering the plates against the gasket is to have a number of vacuum holes cut through the bottom plate and the gasket and applying a vacuum at these locations. Generally, the seal should be sufficient so that the pump used to form the vacuum can be shut down after initially forming the vacuum. The gasket is preferably from about 0.05 mils to about 1 mil more preferably from about 0.1 mils to about 0.3 mils in thickness.

Fluid exiting the bottom of the cell plate 320 can, for instance, simply collect in a catch pan or it can diffuse into a porous substrate such a sintered glass, glass wool, or a fabric material. Alternately, a fifth plate 340 is attached to the underside of the reaction cell and has channels that connect the outlets of the cells 350 to individual collection reservoirs from which fluid can be sampled. For instance, the fifth plate 340 is wider than the plate 320 and the collection reservoirs are located at the top surface of the fifth plate 340 in the area not covered by the plate 320.

Preferably, synthetic processes conducted in the cells 350 of the liquid distribution system will take place on insoluble supports, typically referred to as "beads", such as the styrene-divinylbenzene copolymerizate used by Merrifield when he introduced solid phase peptide synthetic techniques. Merrifield, *J. Am. Chem. Soc.* 85: 2149, 1963. See, also Barany et al., *Innovation and Perspectives in Solid Phase Synthesis: Peptides, Polypeptides, and Oligonucleotides*, Roger Epton, Ed., collected papers of the 2nd International Symposium, Aug. 27–31, 1991, Canterbury, England, p. 29. These supports are typically derivatized to provide a "handle" to which the first building block of an anticipated product can be reversibly attached. In the peptide synthesis area, suitable supports include a p-alkoyxbenzyl alcohol resin ("Wang" or PAM resin) available from Bachem Bioscience, Inc., King of Prussia, Pa.), substituted 2-chlorotrityl resins available from Advanced Chemtech, Louisville, Ky. and polyethylene glycol grafted poly styrene resins (PEG-PS resins) are available from PerSeptive Biosystems, Framingham, Mass. or under the tradename TentaGel™, from Rapp Polymere, GERMANY. Similar solid phase supports, such as polystyrene beads, are also used in the synthesis of oligonucleotides by the phosphotriester approach (see Dhristodoulou, in *Protocols for Oligonucleotide Conjugates*, S. Agrawal, Ed., Humana Press, NJ., 1994), by the phosphoramidite approach (see Beaucage, in *Protocols for Oligonucleotide Conjugates*, S. Agrawal, Ed., Humana Press, N.J., 1994), by the H-phosponate approach (see Froehler, in *Protocols for Oligonucleotide Conjugates*, S. Agrawal, Ed., Humana Press, N.J., 1994), or by the silyl-phosphoramidite method (see Damha and Ogilvie, in *Protocols for Oligonucleotide Conjugates*, S. Agrawal, Ed., Humana Press, N.J., 1994). Suitable supports for oligonucleotide synthesis include the controlled pore glass (cpg) and polystyrene supports available from Applied Biosystems, Foster City, Calif. Solid supports are also used in other small molecule and polymeric organic syntheses, as illustrated in oligocarbamate synthesis for organic polymeric diversity as described by Gorden et al., *J. Medicinal Chem.* 37: 1385–1401, 1994.

Preferably, the cells 350 are rectangular with horizontal dimensions of about 400 μm to about 1200 μm, more preferably about 500 μm to about 1000 μm, yet more preferably about 604 μm or, in an alternative embodiment about 1000 μm, and a depth of about 200 μm to about 300 μm, more preferably about 250 μm. The support beads typically used as in solid-phase syntheses typically have diameters between about 50 μm and about 250 μm, and reactive site capacities of between about 0.1 mmoles/g and about 1.6 mmoles/g. Typically, between about 1 and about 10 of such beads are loaded into a cell 350 to provide a desired capacity of between about 1 nmole and about 10 nmole per cell 350. Recently, beads have become available that have a diameter that ranges between about 200 μm and about 400 μm, depending on the solvent used to swell the beads and the variation in size between the individual beads, and a reactive site capacity of between about 5 nmole and about 20 nmole per bead have become available. These large beads include the beads sold by Polymer Laboratories, Amhearst, Mass. Desirable reactive site functionalities include halogen, alcohol, amine and carboxylic acid groups. With these large beads, preferably only one bead is loaded into each cell 350.

Another option for creating a solid support is to directly derivatize the bottom of the cell 350 so that it can be reversibly coupled to the first building block of the compound sought to be synthesized. The chemistry used to do this can be the same or similar to that used to derivatize controlled pore glass (cpg) beads and polymer beads. Typically, the first step in this process is to create hydroxyl groups (if they do not already exist on the support) or amino groups on the support. If hydroxyl groups exist or are created, they are typically converted to amino groups, for instance by reacting them with gamma-aminopropyl triethoxy silane. Flexible tethers can be added to the amino groups with cyclic acid anhydrides, reactions with polymerized alkylene oxides and other methods known to the art. Examples of such methods are described in Fields et al., "Synthetic Peptides: A User's Guide," W. H. Freeman and Co., Salt Lake City, Utah, 1991.

Methods of creating reactive sites include, for the case where the cell plate 320 is made of plastic, exposing the bottom of the cells 350 to a reactive plasma, such as that created by a glow-discharge in the presence of ammonia or water, to create $NH_2$ groups. Such procedures are described in "Modification of Polymers," Carraher and Tsuda, eds., American Chem. Soc., Washington, D.C., 1980. Another method, useful with glass, ceramic or polymeric substrates, is depositing a film of silicon monoxide by vapor deposition at low temperature to create hydroxyl functionalities. Glass surfaces can be treated with alkali, for instance with KOH or NaOH solutions in water or water/alcohol mixtures, to expose hydroxyl functional groups. Non-annealed borosilicate glass surfaces, including coatings of non-annealed borosilicate glass created by chemical vapor deposition, can be etched, for instance with hydrofluoric acid dissolved in water, to dissolve the regions that are rich in boron, which process creates a porous structure with a large surface area. This porous structure can be treated with alkali to expose hydroxyl groups. The degree of reactive site substitution on such surfaces is preferably at least about 83 nmoles per $cm^2$, more preferably at least about 124 nmoles per $cm^2$ (implying a substitution in 500 micron by 500 μm cell 350 of at least about 0.31 nmole), yet more preferably at least about 256 nmoles per $cm^2$.

The above described methods for using the bottom of the cells 350 as a solid support can be supplemented by methods that increase the surface area of the bottom of the cells 350. One method is to create columnar structures of silicon monoxide, for instance by thermal evaporation of $SiO_x$. Another such method is to insert into the reaction cells fabrics, such as non-woven glass or plastic (preferably fiberglass or polypropylene fiber) fabrics and plasma treating the fabric to create reactive sites.

Another method uses spin-on glass, which creates a thin film of nearly stoichiometric $SiO_2$ from a sil-sesquioxane ladder polymer structure by thermal oxidation. Sol-gel processing creates thin films of glass-like composition from organometallic starting materials by first forming a polymeric organometallic structure in mixed alcohol plus water and then careful drying and baking. When the sol-gel system is dried above the critical temperature and pressure of the solution, an aerogel results. Aerogels have chemical compositions that are similar to glasses (e.g. $SiO_2$) but have extremely porous microstructures. Their densities are comparably low, in some cases having only about one to about three percent solid composition, the balance being air.

D. Capillary Barriers

Figure 5:
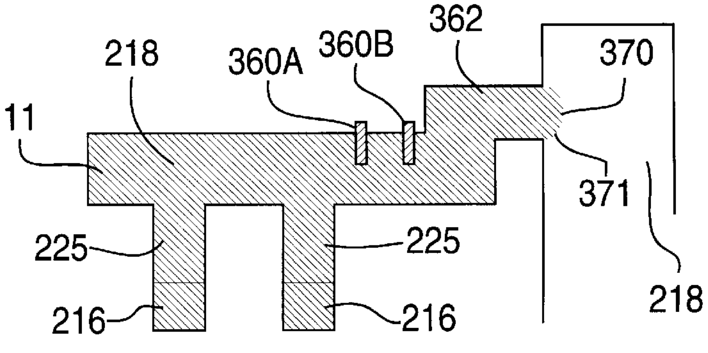
FIG. 5 shows a capillary barrier between a first distribution channel and an open space.

FIG. 5 illustrates a capillary barrier 370, at which a meniscus 371 forms, at the junction between a first distribution channel 222 containing liquid 11 and an open area 218. The meniscus 371 formed at the outlet of first distribution channel 222 into open area 218 will tend to inhibit seepage from the first distribution channel 222, such as the seepage that can result from capillary forces. Also shown are first electrode 360A and second electrode 360B making up first pump 360. This pump can be substituted with an expansion valve-based pump. In some embodiments there are vents (not illustrated) that extend through the feedthrough plate 300 at the tops of open area 218 or third vertical channel 390.

Note that only a small cut-away of NS oriented horizontal feeder channel segments 216 are shown in FIG. 5. Typically, these channels extend inwardly and outwardly from the illustrated cut-away and connect with additional first distribution channels 222 situated to distribute liquid to other reaction cells 350.

As below in reference to FIGS. 6A–6D, the capillary barriers 370 and sluices created by the second openings 362 can act as a combined valve and pump. The barriers 370 prevent flow to the reaction cell, which flow would be favored by capillary forces, until the first pumps 360 or second pumps 361 provide the extra pressure needed to overcome the barriers 370. Narrowing the sluices can increase the capillary forces favoring flow, thereby reducing the amount of added pressure needed to overcome the barriers 370. The use of the barriers 370 allows flow control to be governed by the first pumps 360 or second pumps 361, which are typically controlled by controller 10.

Capillary barriers have been described above with reference to FIG. 5. However, more complex design considerations than were discussed above can, in some cases, affect the design of the capillary barrier. In some cases it is desirable to narrow the sluice formed by second opening 362 to increase the impedance to flow (i.e., the frictional resistance to flow) as appropriate to arrive at an appropriate flow rate when the associated first pump 360 or second pump 361 is activated. Such a narrowing is illustrated by comparing the sluice of FIG. 6A with the narrowed sluice of FIG. 6D. The problem that this design alteration can create is that narrower channels can increase capillary forces, thereby limiting the effectiveness of channel breaks.

Figure 6D:
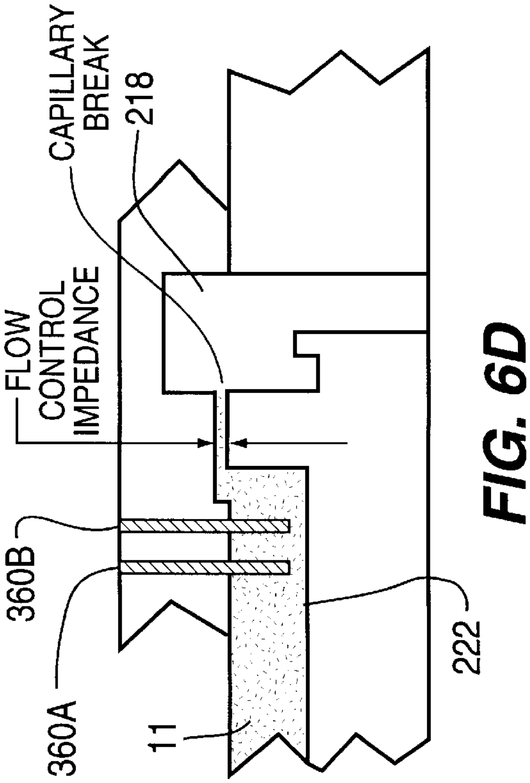
FIGS. 6A, 6B, 6C and 6D show various capillary barrier designs.
Figure 6C:
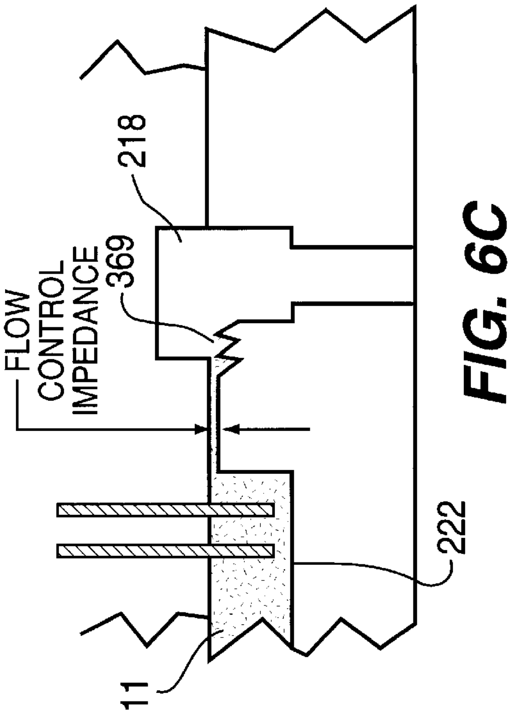
Figure 6A:
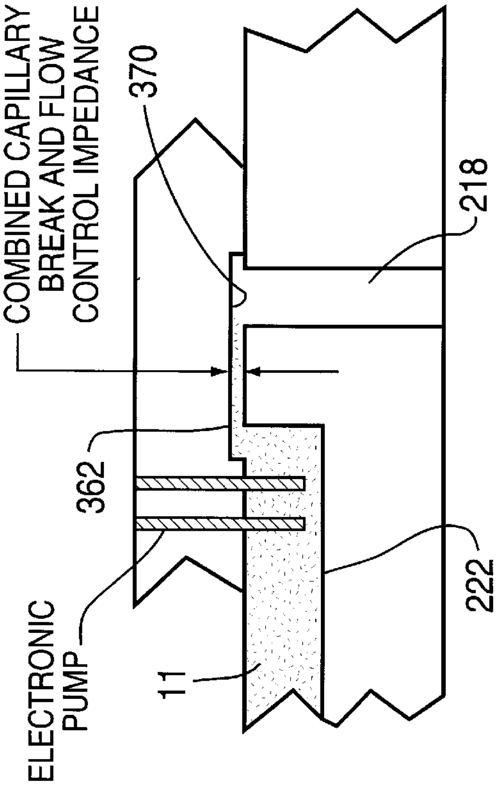
Figure 6B:
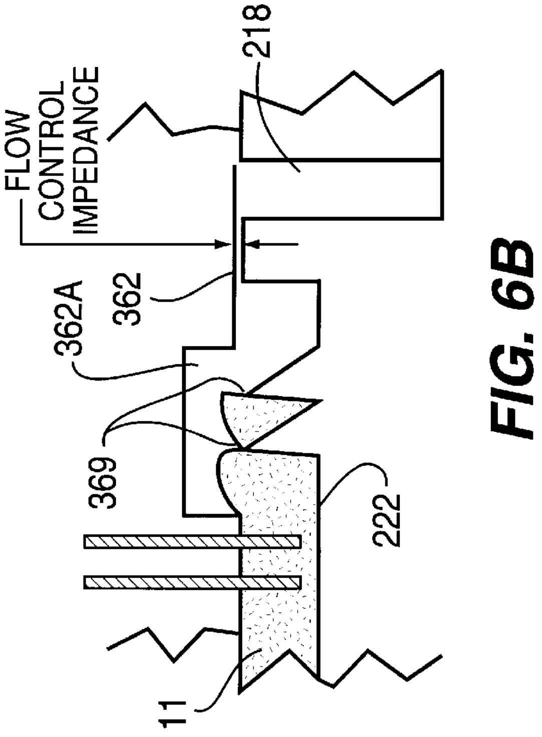

Thus, in one preferred embodiment, a channel break further includes one or more upwardly oriented sharp edges 369, as illustrated in FIGS. 6B and 6C. More preferably, a channel break includes two or more upwardly oriented sharp edges 369. In FIG. 6B, portion 362A of opening 362 is cut more deeply into first plate 300 to create an open space useful for the operation of upwardly oriented sharp edges 369.

In some embodiments, it is desirable to have a gas pressure outlet feeding into the open area into which the capillary barrier opens. The gas pressure is used to clear liquid from this open area and re-establish the capillary break at the capillary barrier 370. The gas pressure can be operated under the control of the controller 10.

E. Fabrication of Plates, Channels, Reservoirs and Reaction Cells

The liquid distribution systems of the invention can be constructed a support material that is, or can be made, resistant to the chemicals sought to be used in the chemical processes to be conducted in the device. For all of the above-described embodiments, the preferred support material will be one that has shown itself susceptible to microfabrication methods that can form channels having cross-sectional dimensions between about 50 μm and about 300 μm, such as glass, fused silica, quartz, silicon wafer or suitable plastics. Glass, quartz, silicon and plastic support materials are preferably surface treated with a suitable treatment reagent such as chloromethylsilane or dichlorodimethylsilane, which minimize the reactive sites on the material, including reactive sites that bind to biological molecules such as proteins or nucleic acids. As discussed earlier, the expansion valve liquid distribution system is preferably constructed of a plastic. In embodiments that require relatively densely packed electrical devices, a non-conducting support material, such as a suitable glass, is preferred. Corning 211 borosilicate glass, and Corning 7740 borosilicate glass, available from Corning Glass Co., Corning, N.Y., are among the preferred glasses.

The system of the invention is preferably constructed from separate plates of materials on which channels, reservoirs and reaction cells are formed, and these plates are later joined to form the liquid distribution system. Preferably, the reaction cell plate, e.g. cell plate 320, is the bottom plate and is reversibly joined to the next plate in the stack. The other plates forming the distribution system, which preferably comprise two to three plates are preferably permanently joined. This joinder can be done, for instance, using adhesives, such as glass-glass thermal bonding.

Suitable methods of joining glass plates are described, for example, in Zanzucchi I.

Plastic plates can be joined together by, for instance, adhesive bonding, lamination, thermal compression bonding, or ultrasonic welding.

The reservoirs, reaction cells, horizontal channels and other structures of the fluid distribution system can be made by the following procedure. A plate, that will for instance make up one of feedthrough plate 300, distribution plate 310, reaction cell plate 320 or intermediate plate 330, is coated sequentially on both sides with, first, a thin chromium layer of about 0.05 μm thickness and, second, a gold film about 0.2 μm thick in known manner, as by evaporation or sputtering, to protect the plate from subsequent etchants. A two micron layer of a photoresist, such as Dynakem EPA of Hoechst-Celanese Corp., Bridgewater, N.J., is spun on and the photoresist is exposed, either using a mask or using square or rectangular images, suitably using the MRS 4500 panel stepper available from MRS Technology, Inc., Acton, Mass. After development to form openings in the resist layer, and baking the resist to remove the solvent, the gold layer in the openings is etched away using a standard etch of 4 grams of potassium iodide and 1 gram of iodine ($I_2$) in 25 ml of water. The underlying chromium layer is then separately etched using an acid chromium etch, such as KTI Chrome Etch of KTI Chemicals, Inc., Sunnyvale, Calif. The plate is then etched in an ultrasonic bath of HF—$HNO_3$—$H_2O$ in a ratio by volume of 14:20:66. The use of this etchant in an ultrasonic bath produces vertical sidewalls for the various structures. Etching is continued until the desired etch depth is obtained. Vertical channels are typically formed by laser ablation.

In plastic plates the horizontal channels, reservoirs and reaction cells are typically formed by molding processes such as injection molding processes. The vertical channels are typically formed by compression molding, injection molding, embossing or laser machining.

The various horizontal channels of the distribution system embodiments typically have depths of about 50 μm to about 250 μm, preferably from about 50 μm to about 100 μm, more preferably from about 50 μm to about 80 μm. The widths of the horizontal channels and the diameters of the vertical channels are typically from about 50 μm to about 300 μm, preferably about 250 μm.

F. Fabrication of Electrode-Based Pumps

In many embodiments, the liquid distribution system of the invention require the formation of electrodes for pumping fluids through the liquid distribution system. These electrodes are generally fabricated in the top glass plate of the liquid distribution system. Typically each pair of electrodes is closely spaced (e.g. 50 to 250 μm separation). The electrodes are fabricated with diameters of preferably about 25 μm to about 150 μm, more preferably about 50 μm to about 75 μm. To produce such structures using mass production techniques requires forming the electrodes in a parallel, rather than sequential fashion. A preferred method of forming the electrodes involves forming the holes in the plate (e.g., feedthrough plate 300) through which the electrodes will protrude, filling the holes with a metallic thick film ink (i.e., a so-called "via ink", which is a fluid material that sinters at a given temperature to form a mass that, upon cooling below the sintering temperature, is an electrically conductive solid) and then firing the plate and ink fill to convert the ink into a good conductor that also seals the holes against fluid leakage. The method also creates portions of the electrodes that protrude through the plate to, on one side, provide the electrodes that will protrude into the liquids in fluid channels and, on the other side, provide contact points for attaching electrical controls. Such electrode forming methods are described in more detail in Zanzucchi I.

In an alternate method of manufacture, for each pump, two or more metal wires, for example gold or platinum wires about 25 μm to 250 μm (about 1–10 mils) in diameter, are inserted into the openings in the channel walls about, e.g., 150 μm apart. The wires were sealed into the channels by means of a conventional gold or platinum via fill ink made of finely divided metal particles in a glass matrix. After applying the via fill ink about the base of the wire on the outside of the opening, the channel is heated to a temperature above the flow temperature of the via fill ink glass, providing an excellent seal between the wires and the channel. The via ink, which is used to seal the holes, can be substituted with, for instance, solder or an adhesive.

Other features of liquid distribution systems are described in Zanzucchi I. The disclosure of this Nov. 9, 1995 application entitled "Liquid Distribution System" and of all the above-recited priority filings named in the Nov. 9, 1995 application are incorporated herein by reference in their entirety.

EXAMPLE

Combinatorial Synthesis of Oligonucleotide

This synthesis begins with a number of polystyrene beads onto which is synthesized, by the phosphoramidite method, a protected oligonucleotide having a sequence (5' to 3'): GGAGCCATAGGACGAGAG. See, for instance, Caruthers et al., *Methods in Enzymology* 211: 3–20, 1992, for further discussion of oligonucleotide synthetic methods. The functionalized polystyrene beads, available from Bacham Bioscience (King of Prussia, Pa.) are inserted into each of the reaction cells of a microscale liquid distribution system having 4×4 reaction cells. The liquid distribution system has four first reservoirs, reservoir-1, reservoir-2, reservoir-3 and reservoir-4, each of which can address any reaction cell in the 4×4 array. The liquid distribution system has four second reservoirs, reservoir-5, reservoir-6, reservoir-7 and reservoir-8, each of which second reservoirs can address the four reaction cells along a given row (i.e., the reaction cells aligned along an EW axis). Further, the liquid distribution system has four third reservoirs, reservoir-9, reservoir-10, reservoir-11 and reservoir-12, each of which third reservoirs can address any of the four reaction cells in the corresponding column (i.e., reaction cells aligned along an NS axis).

The following process steps are executed:

1. Each of the reaction cells in the distribution system is washed with acetonitrile from reservoir-1.
2. 3% trichloro acetic acid (TCA) in dichloromethane, from reservoir-2, is pumped through all of the reaction cells. This solution is effective to remove the dimethoxytrityl protecting groups at the 5' ends of the oligonucleotides on the beads.
3. All of the reaction cells in the liquid distribution system were again flushed with acetonitrile from reservoir-1.
4. To the four reaction cells connected to reservoir-5, a mixture of 0.1M protected adenine phosphoramidite in acetonitrile is added. This addition is effective to attach protected adenosine groups to the 5' ends of the oligonucleotides in the four reaction cells connected to reservoir-5. To the four reaction cells connected to reservoir-6, a mixture of 0.1M protected cytosine phosphoramidite in acetonitrile is added. This addition is effective to attach protected cytosine groups to the 5' ends of the oligonucleotides in the four reaction cells connected to reservoir-6. To the four reaction cells connected to reservoir-7, a mixture of 0.1M protected guanosine phosphoramidite in acetonitrile is added. This addition is effective to attach protected guanosine groups to the 5' ends of the oligonucleotides in the four reaction cells connected to reservoir-7. To the four reaction cells connected to reservoir-8, a mixture of 0.1M protected thymidine phosphoramidite in acetonitrile is added. This addition is effective to attach protected thymidine groups to the 5' ends of the oligonucleotides in the four reaction cells connected to reservoir-7.
5. The reaction cells are washed with acetonitrile from reaction cells from reservoir-1.
6. The reaction cells are flushed with acetic anhydride:2,6-lutidine:tetrahydrofuran 1:1:8 from reservoir-3. This solution is effective to cap any oligonucleotide chains that did not react with the added monomer.
7. The reaction cells are flushed with 1.1M tetrabutylperoxide in dichloroomethane. This step is effective to oxidize the phosphite triester, which links the newly added monomer to the oligonucleotide, to a phosphate triester.
8. Steps 1–3 are repeated.

9. To the four reaction cells connected to reservoir-9, a mixture of 0.1M protected adenine phosphoramidite in acetonitrile is added. This addition is effective to attach protected adenosine groups to the 5' ends of the oligonucleotides in the four reaction cells connected to reservoir-9. To the four reaction cells connected to reservoir-10, a mixture of 0.1M protected cytosine phosphoramidite in acetonitrile is added. This addition is effective to attach protected cytosine groups to the 5' ends of the oligonucleotides in the four reaction cells connected to reservoir-10. To the four reaction cells connected to reservoir-11, a mixture of 0.1M protected guanosine phosphoramidite in acetonitrile is added. This addition is effective to attach protected guanosine groups to the 5' ends of the oligonucleotides in the four reaction cells connected to reservoir-11. To the four reaction cells connected to reservoir-12, a mixture of 0.1M protected thymidine phosphoramidite in acetonitrile is added. This addition is effective to attach protected thymidine groups to the 5' ends of the oligonucleotides in the four reaction cells connected to reservoir-12.

The above outlined process is effective to generate 16 separate oligonucleotides, each with a distinct dinucleotide sequence at the 5' end. Similar synthetic methods can be applied to create various combinatorial molecules, including peptides and other molecules such as those having potential pharmacological activity or those useful for diagnostic or other analytical application.

The present invention provides a liquid distribution system, which is useful in a number of contexts, including accomplishing various synthetic, diagnostic and drug screening reactions. The distribution system can comprise an alpha reservoir and a beta reservoir, a first set of parallel and adjacent first and second feeder channels and a second set of parallel and adjacent third and fourth feeder channels which are offset from the first and second feeder channels, wherein (a) the first and third feeder channels are connected to the alpha reservoir via a first connector channel that is situated above or below the second and fourth feeder channels and are independent of the beta reservoir and (b) the second and fourth feeder channels are connected to the beta reservoir via a second connector channel that is situated above or below the first and third feeder channels and are independent of the alpha reservoir.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A liquid distribution system comprising:

a reaction cell;

two or more feeder channels of diameter of capillary dimensions for distributing liquids;

a separate conduit for each of two or more connected feeder channels connecting that feeder channel to the reaction cell; and a valve for at least one conduit, the valve comprising:

an expandable chamber comprising an elastic material;

an expandable fluid enclosed within the expandable chamber, wherein the expandable chamber has an expanded state wherein the elastic material fills a cross-section of the conduit and prevents fluid flow through the conduit and an contracted state that does not fill a cross-section of the conduit so that liquid flow through the conduit is allowed; and a heater element for heating the expandable chamber to cause the expansion that closes the valve.

2. The distribution system of claim 1 further comprising at least about two reaction cells, each separately connected to two or more feeder channels via conduits which each have the valve.

3. The distribution system of claim 1, wherein at least one said conduit has a capillary barrier interposed to check the flow between the connected feeder channel and the connected reaction cell.

4. The distribution system of claim 1, wherein at least one conduit has two or more of the valves.

5. The distribution system of claim 4, wherein at least one said conduit has three or more of the valves which can be operated in concert to pump liquid from the connected feeder channel into the reaction cell.

6. A liquid distribution system with a solid support comprising:

a reaction cell;

formed within the solid support, two or more feeder channels for distributing liquids;

formed within the solid support, a separate conduit for each feeder channel connecting that feeder channel to the reaction cell; and formed within the solid support, a valve for at least one conduit, the valve comprising:

an expandable chamber comprising an elastic material; and an expandable fluid enclosed within the expandable chamber, wherein the expandable chamber has an expanded state created by directing energy to the expandable chamber to expand the fluid, wherein in the expanded state the elastic material fills a cross-section of the conduit and prevents fluid flow through the conduit, and an contracted state that does not fill a cross-section of the conduit so that liquid flow through the conduit is allowed.

7. The liquid distribution system of claim 6, wherein the solid support comprises glass, fused silica, quartz, silicon wafer or plastic.

8. The distribution system of claim 6, wherein at least one conduit has a capillary barrier interposed to check the flow between the connected feeder channel and the connected reaction cell.

9. The distribution system of claim 6, wherein the valve further comprises, formed within the solid support:

a heater for heating the expandable fluid to cause the fluid to expand and thereby close the valve.

10. The liquid distribution system of claim 6, wherein the solid support is plastic.

11. The distribution system of claim 6, wherein at least one conduit has two or more of the valves.

12. The distribution system of claim 11, wherein at least one conduit has three or more of the valves can be operated in concert to pump liquid from the connected feeder channel into the reaction cell.

* * * * *